United States Patent [19]
Matsuda et al.

[11] 4,327,374
[45] Apr. 27, 1982

[54] FLESH CORRECTION CIRCUIT FOR A COLOR TELEVISION RECEIVER

[75] Inventors: Yoshiteru Matsuda, Kadoma; Tetsuo Tomimoto, Osaka; Yoshitomo Nagaoka, Neyagawa, all of Japan

[73] Assignee: Matsushita Electric Industrial Co., Ltd., Osaka, Japan

[21] Appl. No.: 146,118

[22] Filed: May 2, 1980

[30] Foreign Application Priority Data

May 10, 1979 [JP] Japan .................................. 54-57283

[51] Int. Cl.³ .......................................... H04N 9/535
[52] U.S. Cl. ..................................................... 358/28
[58] Field of Search .......................................... 358/28

[56] References Cited

U.S. PATENT DOCUMENTS

4,001,879 1/1977 Nagaoka et al. ..................... 358/28

Primary Examiner—Robert L. Richardson
Attorney, Agent, or Firm—Wenderoth, Lind & Ponack

[57] ABSTRACT

A flesh correction circuit for a color television receiver includes a reference flesh signal generator for generating a signal corresponding to flesh tone, a flesh signal detector for detecting a flesh signal of a carrier chrominance signal, a carrier chrominance signal corrector for correcting the carrier chrominance signal by mixing the carrier chrominance signal and an output signal of the reference flesh signal generator with a mixing ratio controlled by an output signal of the flesh signal detector.

15 Claims, 16 Drawing Figures

FLESH CORRECTION CIRCUIT FOR A COLOR TELEVISION RECEIVER

BACKGROUND OF THE INVENTION

This invention relates to an automatic flesh correction circuitry for a color television receiver.

Reproduced colors of a color television receiver are often distorted due to signal transmission line distortions, a variation of characteristics of a color television camera, a variation of illumination in a studio and so on. For this reason, viewers often have to adjust a color television receiver to get good pictures. Therefore, it is very important to automatically reproduce desired colors matched to human visual memory, because viewers will not tolerate bad flesh tones.

To acquire desired flesh reproduction with less adjustment, several kinds of flesh correction systems have been proposed. One is a VIR (vertical interval reference) control system which corrects color signals with reference to VIRS (vertical interval reference signals) inserted in a vertical interval of a transmitted signal. This system is very useful if VIRS has adequate information with respect to the transmission line distortions. But, when the VIRS itself is unreliable, its use will increase color reproduction errors in comparison with those occuring without VIRS.

Another flesh correction system is a phase correction system which modulates a subcarrier phase referring to a phase difference between a subcarrier and a carrier chrominance signal. This system comprises a subcarrier generator for generating a subcarrier whose phase corresponds to I axis, a phase detector for detecting a phase difference between the subcarrier and the carrier chrominance signal, an adder for adding the subcarrier and the carrier chrominance signal, a phase shifter of an output signal of the adder, a chrominance decoder for decoding chrominance difference signals, I and Q, from the carrier chrominance signal, using an output signal of the adder and an output signal of the phase shifter. In it, a subcarrier phase is modulated by an output signal of the phase detector, whereby this system controls a decoding phase of the chrominance decoder when a carrier chrominance signal phase is in the vicinity of the flesh tone phase. It is clear that this system stabilizes a hue of a reproduced color and pulls a transmitted color into the flesh tone. However, as this system changes a decoding phase of a chrominance decoder in the vicinity of a flesh tone, it inherently distorts the transmitted signal and this distortion is, very noticeable in highly saturated green, magenta or red. For example, a green tree becomes a yellowish dead tree.

SUMMARY OF THE INVENTION

It is an object of this invention to provide for the flesh correction circuitry for compensating a distortion of a transmitted carrier chrominance signal in a color television receiver.

It is another object of this invention to provide a flesh correction circuitry for reproducing a desired flesh tone which is based on human visual memory.

These objects are achieved according to this invention by providing a flesh correction circuitry for a color television receiver comprising a reference flesh signal generator for generating reference flesh signals corresponding to a flesh tone, a flesh signal detector for detecting a flesh signal of a carrier chrominance signal, a carrier chrominance signal corrector for correcting a carrier chrominance signal by mixing the carrier chrominance signal and an output signal of said reference flesh signal generator with a mixing ratio controlled by an output signal of the flesh signal detector.

BRIEF DESCRIPTION OF THE DRAWINGS

These and other objects and features of this invention will be apparent from the following descriptions taken in connection with the accompany drawings, in which.

DESCRIPTION OF THE PREFERRED EMBODIMENTS

The fidelity of reproduced colors in a color television receiver is often distorted by the afore-mentioned several factors, and picture adjustments are often required not only upon changing channels but also upon changes of programs in the same channel. Several kinds of flesh correction systems have been proposed and some of them have been practically applied to receivers. A representative one of them is a flesh correction system which modulates a subcarrier in the vicinity of a flesh color with reference to a phase information of a transmitted carrier chrominance signal.

Figure 1:
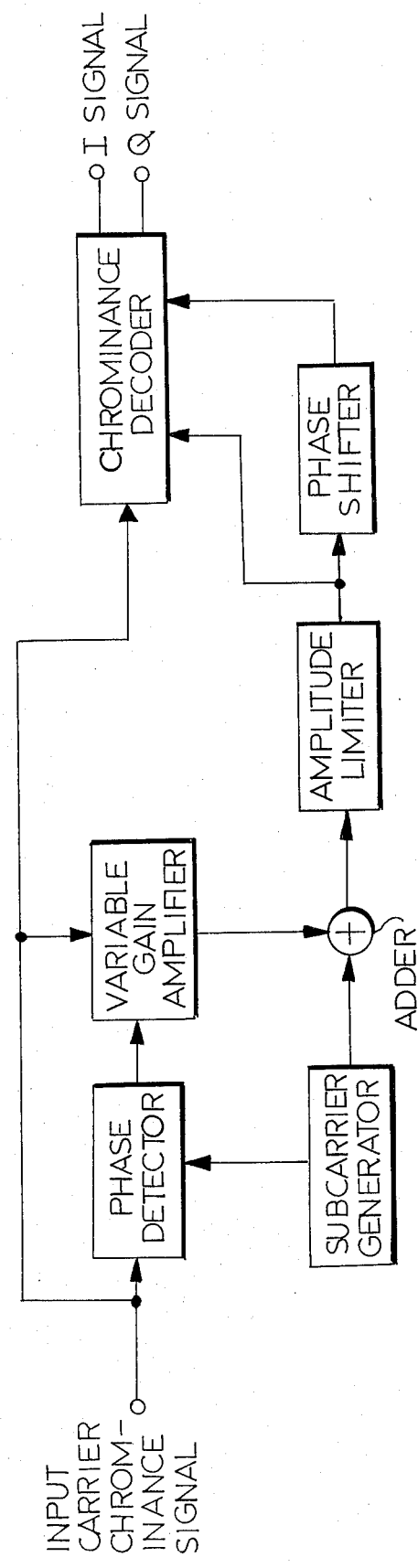
FIG. 1 is a block diagram of an embodiment according to one of the conventional flesh correction systems.

Referring now to FIG. 1, there is shown a block diagram of an embodiment according to such a conventional system. This flesh correction system comprises, as shown, a subcarrier generator for generating a subcarrier with a phase corresponding to an I axis, a phase detector for detecting a phase difference between the subcarrier and an input carrier chrominance signal, a variable gain amplifier which controls the level of the input carrier chrominance signal by an output signal of said phase detector, an adder for adding the subcarrier to an output signal of the variable gain amplifier, an amplitude limiter for limiting an output signal of the adder to a constant amplitude, a phase shifter for shifting a phase of an output signal of the amplitude limiter by 90 degrees, and a chrominance decoder for decoding I and Q signals from the input carrier chrominance signal with reference to an output signal of the amplitude limiter and an output signal of the phase shifter.

When an input carrier chrominance signal phase is very much different from the flesh tone phase, the variable gain amplifier prohibits flesh correction by attenuating the input carrier chrominance signal, and allowing the subcarrier to pass through the adder without phase modification.

Figure 2:
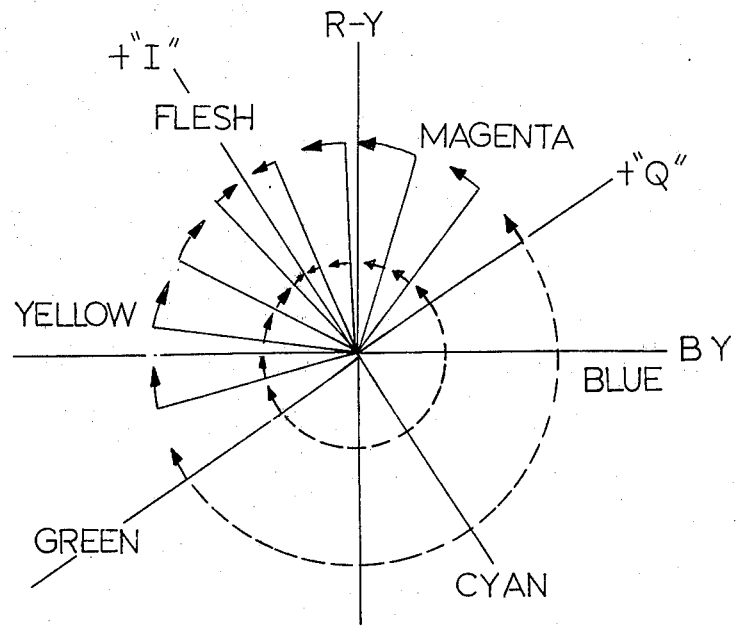
FIG. 2 is a vector diagram which shows the color compensating characteristics of the conventional flesh correction system shown in FIG. 1.

FIG. 2 shows a color compensating characteristics of the flesh correction system shown in FIG. 1. The circle diagram represents the loci of the carrier chrominance signals, and arrow signs indicate the rotation of the vectors due to flesh correction. Those signals on the I axis (i.e. flesh tone phase) and in the negative I region are unaffected. Also phase rotations of the signals in close vicinity of the I axis are relatively small. The maximum shift occurs in colors of the magenta and yellow-green areas, and its direction is towards the flesh colors. The amplitude of the rotated signals remains constant and the saturation is not affected by this kind of flesh control.

As this flesh correction system varies a decoding axis of the chrominance decoder by the phase information of an input carrier chrominance signal, it inherently distorts a transmitted signal. The distortions of highly saturated colors in magenta and yellow-green areas are very noticeable. For example, green trees become yellowish dead trees. A bright red rose becomes a flesh-tone rose. It is necessary to keep such distortions to a minimum and to restrict correction areas to a vicinity of flesh tones. However, it is impossible to meet such needs according to such a conventional system.

This invention solves those problems of the conventional system by detecting a true flesh tone signal of a carrier chrominance signal, and realizes a new flesh correction system for compensating the saturation as well as hue of reproduced colors in the vicinity of the flesh tone without affecting any other colors. This system detects a phase and an amplitude of a received carrier chrominance signal in order to restrict the flesh correction to the limited region around a flesh tone.

Figure 3:
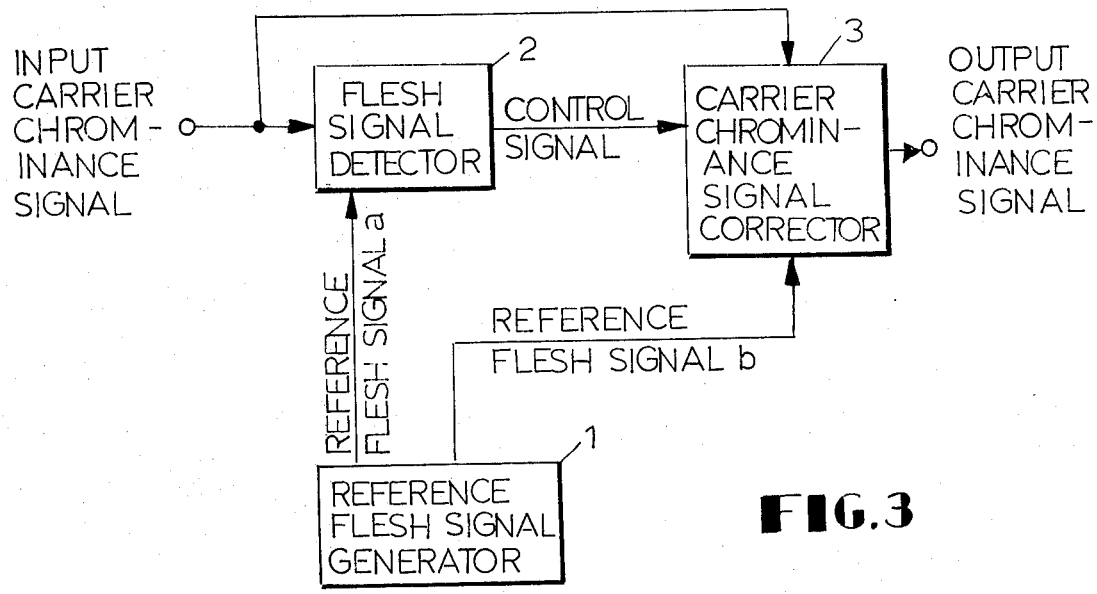
FIG. 3 is a block diagram of an embodiment according to this invention.

Referring now to FIG. 3, there is shown a block diagram of an embodiment according to this invention. A reference flesh signal generator 1 generates reference flesh signal a, corresponding to a flesh tone, and another reference flesh signal b corresponding to a flesh tone. The reference flesh signal a and an input carrier chrominance signal are fed to a flesh signal detector 2. It detects a difference signal between the input carrier chrominance signal and the reference flesh signal a, and generates a control signal responsive to the difference signal. The input carrier chrominance signal, the reference flesh signal b and the control signal are fed to a carrier chrominance signal corrector 3. The corrector 3 mixes the input carrier chrominance signal and the reference flesh signal b with a mixing ratio controlled by the control signal.

Figure 4:
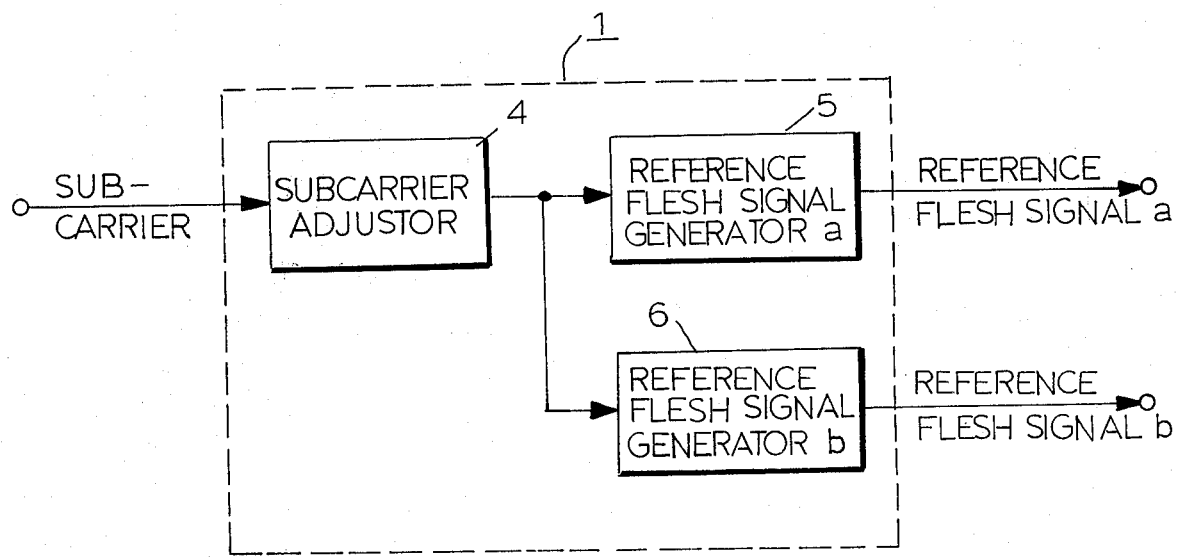
FIG. 4 is a more detailed block diagram of an embodiment of the reference flesh signal generator shown in FIG. 3.

FIG. 4 shows a more detailed block diagram of an embodiment of the reference flesh signal generator 1. The blocks enclosed by dotted lines corresponds to the block 1 in FIG. 3. A subcarrier is fed to a subcarrier adjustor 4 for adjusting the phase and/or amplitude of the subcarrier to obtain a signal with a certain phase and amplitude. An output signal of the subcarrier adjustor 4 is fed to reference flesh signal generator a 5 and reference flesh signal generator b 6 for generating reference flesh signals a and b, respectively. Those reference flesh signals substantially represent a flesh tone phase and amplitude.

Figure 5:
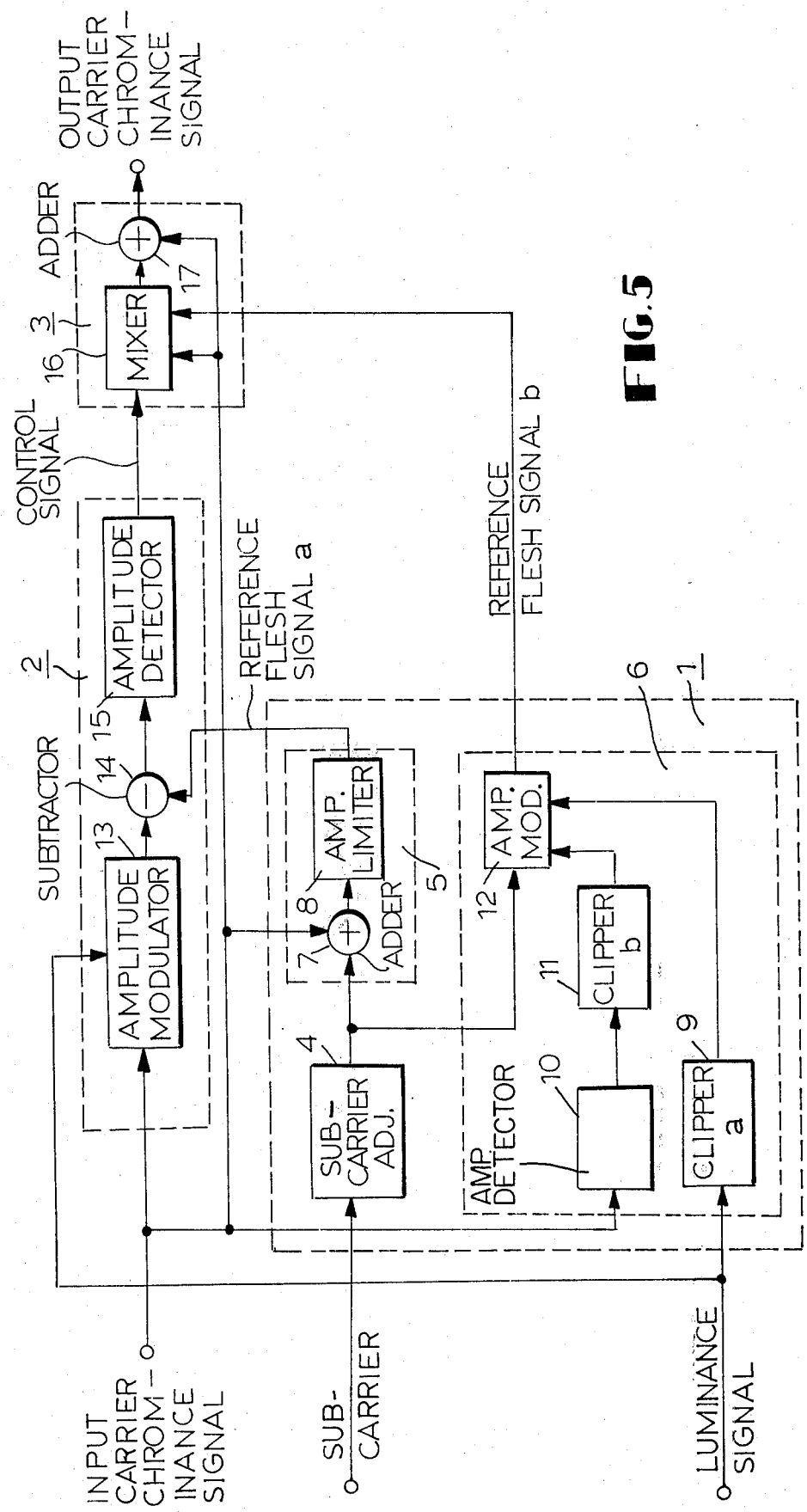
FIG. 5 is a more detailed block diagram of an embodiment according to this invention.

FIG. 5 shows a more detailed block diagram of an embodiment according to this invention. The blocks enclosed by dotted lines correspond to the blocks with the same numerals in FIGS. 3 and 4. The subcarrier is fed to the subcarrier adjustor 4 for adjusting the phase and/or amplitude of the subcarrier. The reference flesh signal generator a 5 comprises an adder 7 for adding an output signal of the subcarrier adjustor and the input carrier chrominance signal, and an amplitude limiter 8 for limiting an output signal of the adder 7 to a constant amplitude. A phase modulated subcarrier with a constant amplitude is obtained at the output of the reference flesh signal generator a when the amplitude of the output signal of the subcarrier adjustor is always larger than the amplitude of the input carrier chrominance signal.

The reference flesh signal generator b 6 comprises a clipper a 9 which receives a luminance signal and clips high levels of the luminance signal, an amplitude detector 10 which receives the input carrier chrominance signal and detects its amplitude, a clipper b 11 which receives an output signal of the amplitude detector and clips its low level, an amplitude modulator 12 which receives the output signal of the subcarrier adjustor, an output signal of the clipper a and an output signal of the clipper b and modulates the output signal of the subcarrier adjustor by the output signal of the clipper a or by the output signal of the clipper b. Its modulation index is larger when the luminance level is higher. This modulation is needed to substantially keep constant the ratio of the reference flesh signal amplitude to the luminance signal, since a reproduced color saturation corresponds to this ratio, not to the amplitude of the reference flesh signal b.

In the same manner, the higher a carrier chrominance signal level becomes, the larger the modulation index becomes. Thus, providing some amplitude information of an original carrier chrominance signal to the reference flesh signal b, this modulation gives natural variations to reproduced flesh tones. The clipper also gives a natural flesh color, by reducing the ratio of the reference flesh signal to the luminance signal (i.e. reducing color saturation) at a rather bright flesh color.

The flesh signal detector 2 comprises an amplitude modulator 13, a subtractor 14 and an amplitude detector 15. The input carrier chrominance signal and the luminance signal are fed to the amplitude modulator 13 which modulates the input carrier chrominance signal by the luminance signal. The amplitude modulator 13 reduces the input carrier chrominance signal for higher luminance level to match the flesh-vicinity signal region to the comparable level with the reference flesh signal a. An output signal of the amplitude modulator and an output signal of the reference flesh signal generator a are fed to the subtractor 14 which subtracts the output signal of the reference flesh signal generator a from the output signal of the amplitude modulator. An output signal of the subtractor is fed to the amplitude detector 15 which detects an amplitude of an output signal of the subtractor to obtain a control signal. This control signal accurately indicates the difference between a received color at the television receiver and the desired flesh tone.

When colors corresponding to an input carrier chrominance signal are in the vicinity of a reference flesh color, the carrier chrominance signal corrector corrects the input carrier chrominance signal in response to the control signal. When colors corresponding to the input carrier chrominance signal are far from reference flesh color, the control signal prohibits flesh correction and the input carrier chrominance signal passes, as it is, through the carrier chrominance signal corrector.

The carrier chrominance signal corrector 3 comprises a mixer 16 and an adder 17. The reference flesh signal b, the control signal and an input carrier chrominance signal are fed to the mixer 16, which mixes the reference flesh signal b and the input carrier chrominance signal with a mixing ratio controlled by the control signal. An output signal of the mixer and the input carrier chrominance signal are fed to the adder 17, and are added there to develop at the output a modified carrier chrominance signal. Therefore, this signal contains the necessary and sufficient level of original chrominance signal to prohibit the reproduced flesh color to become a mono-tone.

Figure 6:
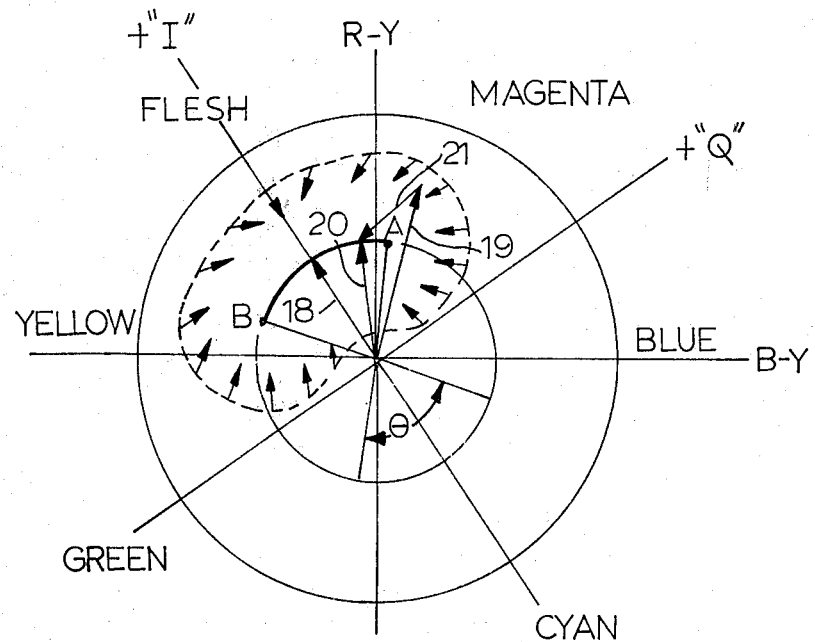
FIG. 6 is a vector diagram which shows color compensating characteristics of this invention.

FIG. 6 shows the flesh correction characteristics of this invention. The circle diagram and arrow signs represent the loci of the chrominance signals and the variation of the vectors due to flesh correction, respectively. Vector 18 represents the reference flesh signal with a certain phase and a certain amplitude. A circular arc AB represents a locus of an output signal of the reference flesh signal generator a, when a phase of an input carrier chrominance signal varies from zero to 360 degrees. A maximum phase deviation $\ominus$ depends on the additive amplitude ratio in the adder 7 of an output signal of the subcarrier adjustor to an input carrier chrominance signal.

When an input carrier chrominance signal designated by the vector 19 is received, the reference flesh signal a (vector 20) is outputted from the reference flesh signal generator a. The flesh signal detector compares the input carrier chrominance signal (vector 19) with the reference flesh signal (vector 20), and outputs the difference signal between them (vector 21). When the length of vector 21 is larger than a certain length indicating a color compensating region (i.e. when the received color is far from a flesh tone), the input carrier chrominance signal passes through the carrier chrominance signal corrector 3 without correction. When the length is smaller than the certain length (i.e. when the received color is in the vicinity of the flesh tone), the input carrier chrominance signal is corrected by being mixed with the reference flesh signal b in the carrier chrominance signal corrector 3.

The arrow signs shown in FIG. 6 indicate flesh compensating characteristics and the area enclosed by a dashed line is a flesh compensating region. As is obvious from FIG. 6, both the hue and saturation of a received color included in the flesh compensating region are corrected and stabilized to a desired flesh color with an adequate hue and saturation. A received color out of the flesh compensating region is not affected by this correction system.

Accordingly, primary red, blue, green and other highly saturated colors are not affected.

Figure 7:
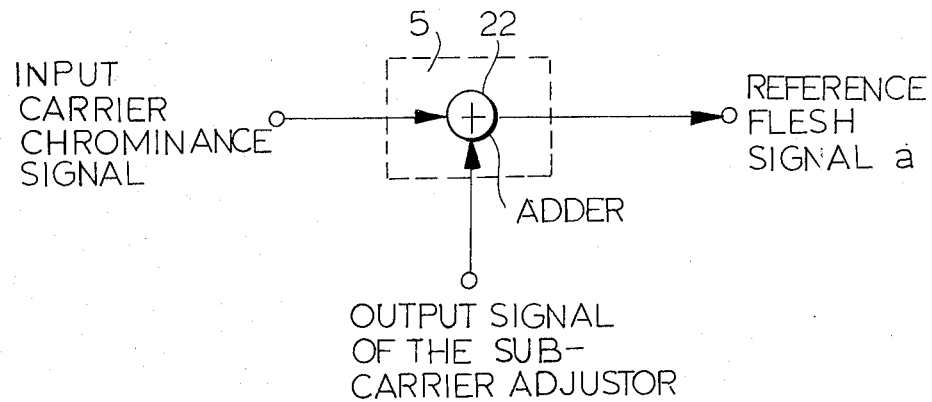
FIGS. 7, 8 and 9 show other constructions of an embodiment of the reference flesh signal generator a shown in FIG. 4.
Figure 8:
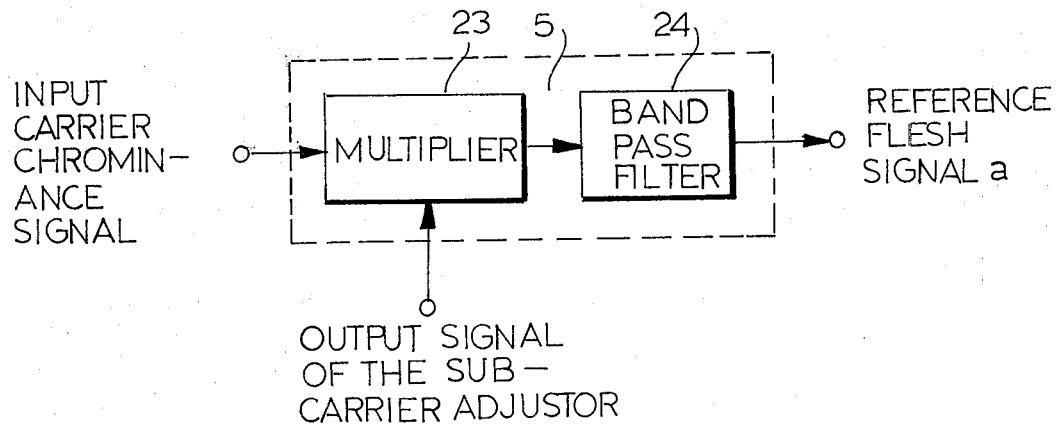
Figure 9:
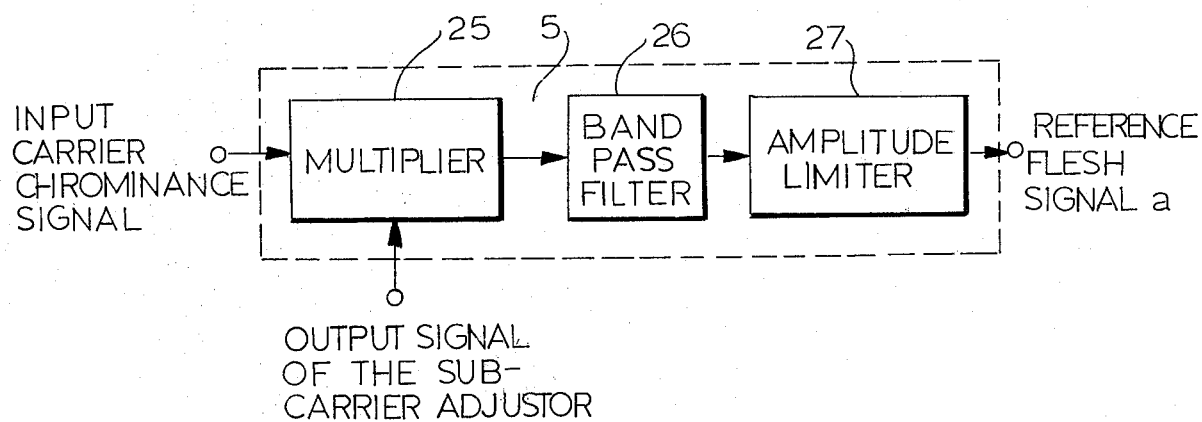

Other embodiments of the reference flesh signal generator a 5 are shown in FIGS. 7, 8 and 9. In FIG. 7, the reference flesh signal generator a comprises an adder 22 for adding an output signal of the subcarrier adjustor 4 to the input carrier chrominance signal to obtain a reference flesh signal a. In FIG. 8, the reference flesh signal generator a comprises a multiplier 23 for multiplying an output signal of the subcarrier adjustor 4 by the input carrier chrominance signal, and a band pass filter 24 for receiving an output signal of the multiplier and for passing its fundamental frequency component to obtain a reference flesh signal a. In FIG. 9, the reference flesh signal generator a comprises a multiplier 25 for multiplying an output signal of the subcarrier adjustor 4 by the input carrier chrominance signal, a band pass filter 26 for receiving an output signal of the multiplier and for passing its fundamental frequency component, and an amplitude limiter 27 for receiving an output signal of the band pass filter and for limiting its amplitude to a constant level to obtain a reference flesh signal a.

The reference flesh signal generator a, as shown in FIGS. 7, 8 and 9, modifies the phase and/or amplitude of the output signal of the subcarrier adjustor with the input carrier chrominance signal. This modification makes the flesh color detection from the input carrier chrominance signal more accurate, and makes the reproduced flesh color on a television receiver more natural.

Figure 10:
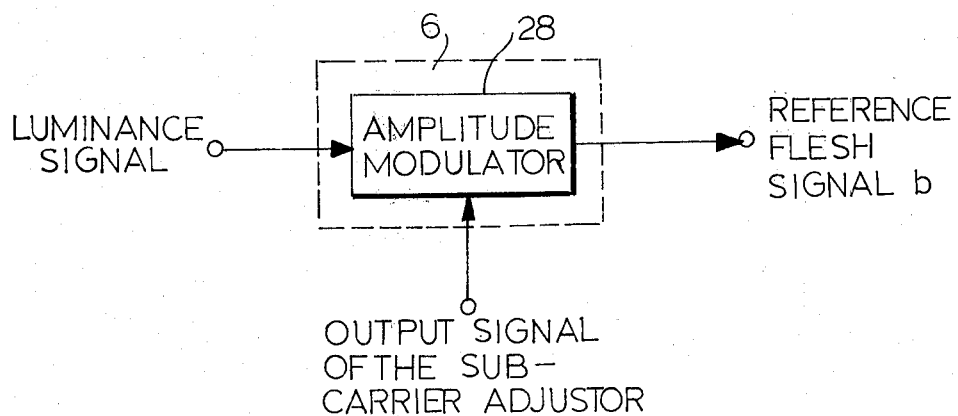
FIGS. 10, 11, 12 and 13 show other constructions of an embodiment of the reference flesh signal generator b shown in FIG. 4.
Figure 11:
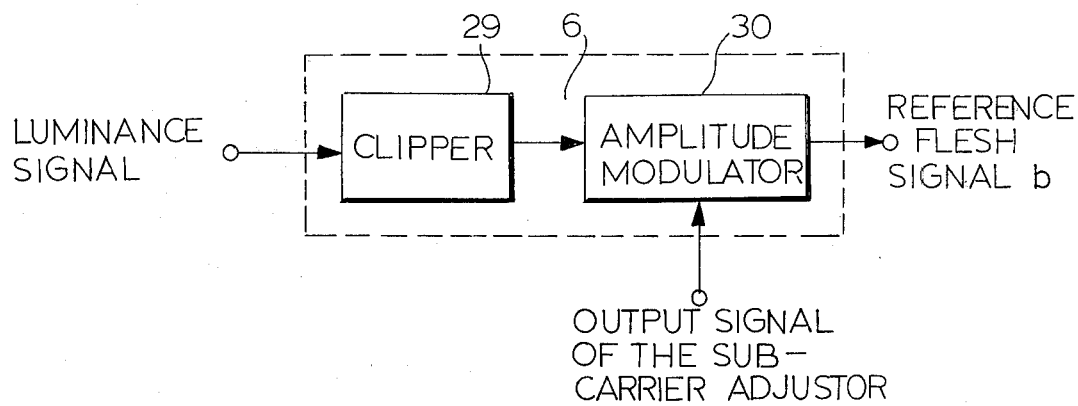

Other embodiments of the reference flesh signal generator b 6 are shown in FIGS. 10, 11, 12 and 13. In FIG. 10, the reference flesh signal generator b comprises an amplitude modulator 28 for modulating an output signal of the subcarrier adjustor 4 with a luminance signal to obtain the reference flesh signal b. Its modulation index is larger when the luminance level is higher. In FIG. 11, the reference flesh signal generator b comprises a clipper 29 for clipping high levels of a luminance signal, and an amplitude modulator 30 for modulating an output signal of the clipper by an output signal of the subcarrier adjustor 4 to obtain a reference flesh signal b. Its modulation index is larger when the luminance level is higher.

Figure 12:
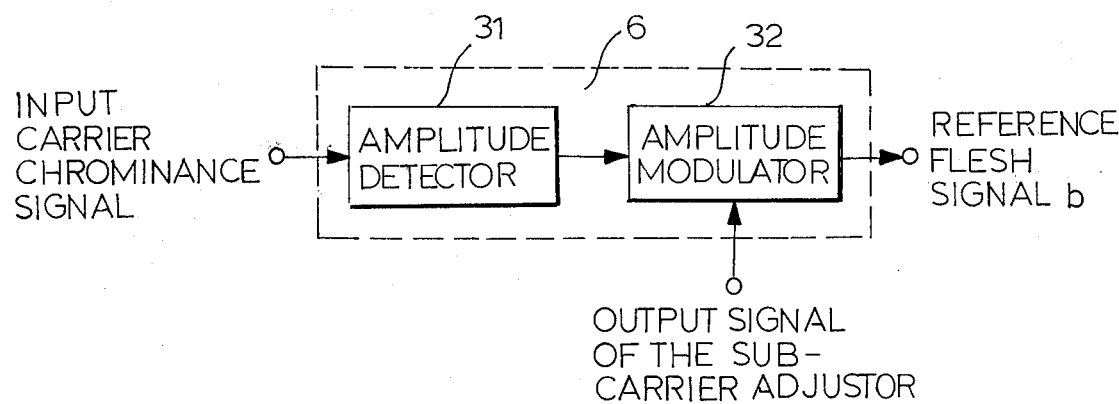
Figure 13:
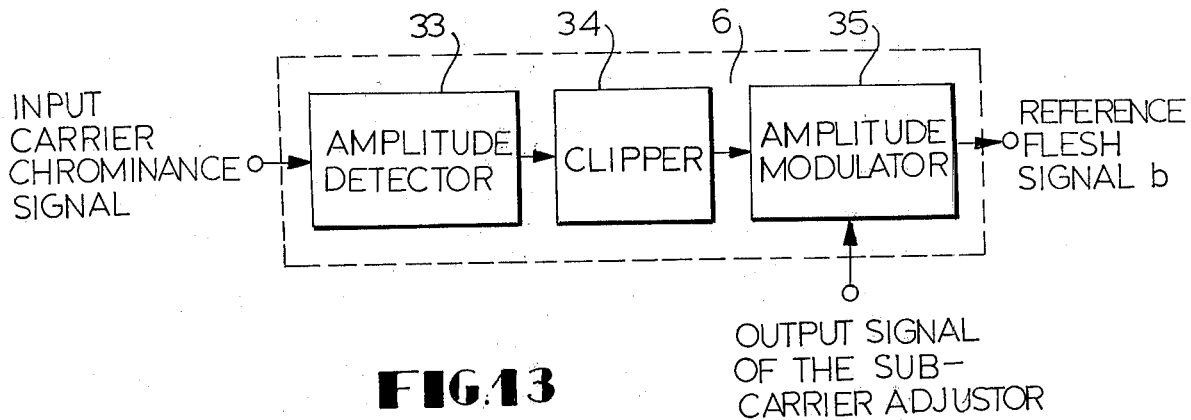

In FIG. 12, the reference flesh signal generator b comprises an amplitude detector 31 for detecting the amplitude of the input carrier chrominance signal, and an amplitude modulator 32 for modulating an output signal of the subcarrier adjustor 4 with an output signal of the amplitude detector to obtain a reference flesh signal b. Its modulation index is larger when the amplitude of the input carrier chrominance signal is larger. In FIG. 13, the reference flesh signal generator b comprises an amplitude detector 33 for detecting the amplitude of an input carrier chrominance signal, a clipper 34 for clipping low levels of an output signal of the amplitude detector, and an amplitude modulator 35 for modulating an output signal of the subcarrier adjustor with an output signal of the clipper to obtain a reference flesh signal b. Its modulation index is larger when the amplitude of the input carrier chrominance signal is larger.

The reference flesh signal generator b shown in FIGS. 10, 11, 12 and 13 modifies the amplitude of the output signal of the subcarrier adjustor with the luminance signal or the input carrier chrominance signal. Each modification leaves the information of the original luminance signal or the original input carrier chrominance signal to the reference flesh signal b, and gives natural variations to reproduced flesh tones on a television receiver.

Figure 14:
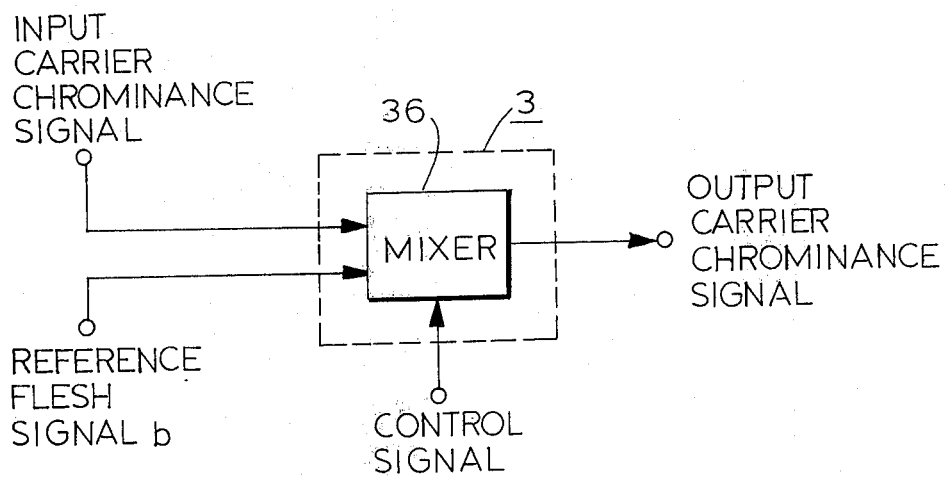
FIGS. 14, 15 and 16 show other constructions of an embodiment of the carrier chrominance signal corrector shown in FIG. 3.
Figure 15:
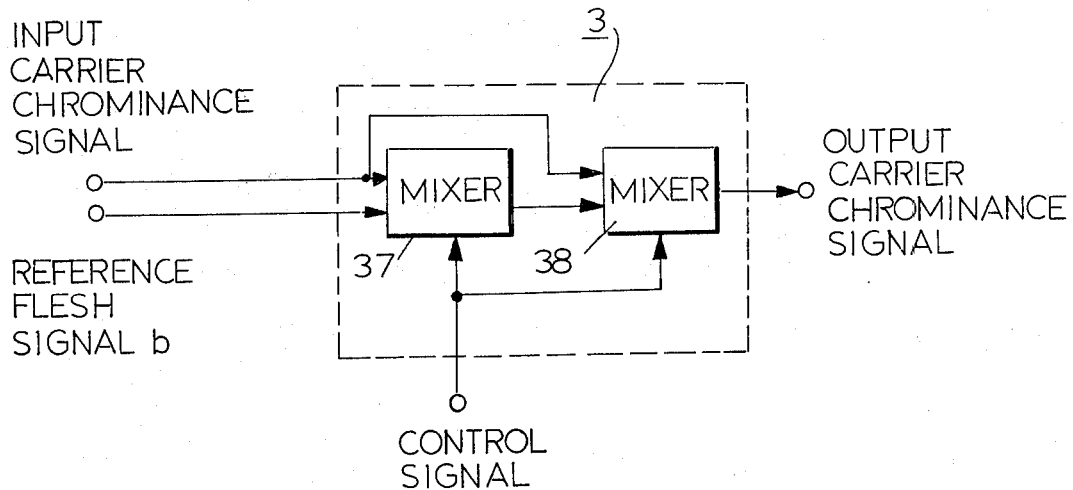
Figure 16:
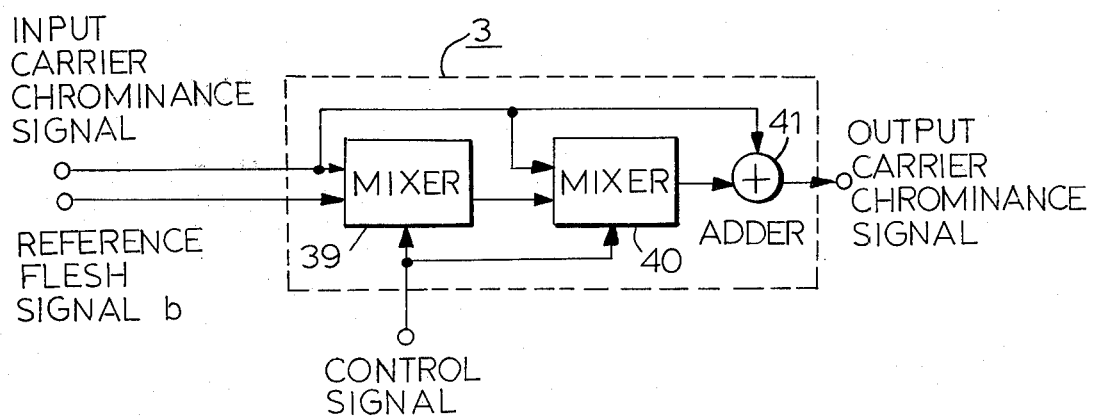

Other embodiments of the carrier chrominance signal corrector 3 are shown in FIGS. 14, 15 and 16. In FIG. 14, the carrier chrominance signal corrector 3 comprises a mixer 36 for receiving an input carrier chrominance signal, the reference flesh signal b and the control signal. The mixer 36 mixes the input carrier chrominance signal and the reference flesh signal b with a mixing ratio controlled by the control signal to obtain an output carrier chrominance signal. This corrector can change the input carrier chrominance signal into the reference flesh signal b. It is effective when a received flesh color is heavily distorted.

In FIG. 15, the carrier chrominance signal corrector 3 comprises a mixer 37 for receiving an input carrier chrominance signal, the reference flesh signal b and the control signal. The mixer 37 mixes the input carrier chrominance signal and the reference flesh signal b with a mixing ratio controlled by the control signal. The carrier chrominance signal corrector 3 also comprises the mixer 38 for receiving the input carrier chrominance signal, an output signal of the mixer 37, and the control signal. The mixer 38 mixes the input carrier chrominance signal and the output signal of the mixer 37 with a mixing ratio controlled by the control signal to obtain an output carrier chrominance signal. In FIG. 16, an adder 41 is connected to the output terminal of the carrier chrominance signal corrector shown in FIG. 15. The mixer 39 corresponds with the mixer 37 in FIG. 15. The mixer 40 corresponds with the mixer 38 in FIG. 15. The adder 41 adds the input carrier chrominance signal and the output signal of the mixer 40 to obtain an output carrier chrominance signal. The carrier chrominance signal correctors shown in FIGS. 15 and 16 can be constructed (i) to pass therethrough the original input carrier chrominance signal without flesh correction, when the received color just corresponds to the reference flesh color (i.e. when the input carrier chrominance signal just corresponds to the reference flesh signal a) and when the received color is far from the reference flesh color, and (ii) to correct the input carrier chrominance signal when the received color is in the vicinity of the reference flesh color. These correctors are effective to reproduce delicate variations of the flesh tones on a television receiver. The corrector shown in FIG. 15 is also effective when the received color is heavily distorted. It is clear from the above descriptions that this invention, which places its basis on the above mentioned principle, stabilizes distorted flesh colors and reproduces desired flesh colors without affecting primary red, blue, green and other highly saturated colors.

In the foregoing descriptions, it is assumed that the reference color corresponds to a flesh color. It is obvious, however, that this invention can be applied to another reference color. When the certain reference color is selected, this sytem stabilizes distorted colors in the vicinity of its certain color without affecting any other colors.

It is intended that all matters contained in the foregoing descriptions and in the drawings shall be interpreted as illustrative only, not as limitative, of this invention.

What is claimed is:

1. A flesh correction circuitry for a color television receiver, for obtaining a desired flesh reproduction and for minimizing color distortions included in a transmitted color signal, comprising:
    a reference flesh signal generator for generating two kinds of reference flesh signals;
    a flesh signal detector for receiving one of said reference flesh signals and an input carrier chrominance signal, and for generating a control signal corresponding to a phase difference and an amplitude difference between said reference flesh signal and said input carrier chrominance signal; and
    a carrier chrominance signal corrector for receiving one of said reference flesh signals, said input carrier chrominance signal, and said control signal, and for mixing the former two signals in response to the latter control signal.

2. A flesh correction circuitry for a color television receiver according to claim 1, wherein said reference flesh signal generator comprises: a subcarrier adjustor for receiving a subcarrier, and for changing a phase and/or an amplitude of said subcarrier; and reference flesh signal generators a and b for receiving an output signal of said subcarrier adjustor, and for generating reference flesh signals.

3. A flesh correction circuitry for a color television receiver, for obtaining a desired flesh reproduction and for minimizing color distortions included in a transmitted color signal, comprising:
    a reference flesh signal generator for generating two kinds of reference flesh signals;
    a flesh signal detector for receiving one of said reference flesh signals and an input carrier chrominance signal, and for generating a control signal corresponding to a difference signal between said reference flesh signal and said input carrier chrominance signal; and
    a carrier chrominance signal corrector for receiving one of said reference flesh signals, said input carrier chrominance signal, and said control signal, and for mixing the former two signals in response to the latter control signal;
    wherein said reference flesh signal generator comprises: a subcarrier adjustor for receiving a subcarrier, and for changing a phase and/or an amplitude of said subcarrier; and reference flesh signal generators a and b for receiving an output signal of said subcarrier adjustor, and for generating reference flesh signals;
    wherein said reference flesh signal generator a comprises: an adder for receiving an input carrier chrominance signal and an output signal of said subcarrier adjustor, and for adding these received signals.

4. A flesh correction circuitry for a color television receiver according to claim 3, wherein said reference flesh signal generator a further comprises: an amplitude limiter for receiving an output signal of said adder and for limiting an amplitude of the output signal of said adder to a constant level.

5. A flesh correction circuitry for a color television receiver, for obtaining a desired flesh reproduction and for minimizing color distortions included in a transmitted color signal, comprising:
    a reference flesh signal generator for generating two kinds of reference flesh signals;
    a flesh signal detector for receiving one of said reference flesh signals and an input carrier chrominance signal, and for generating a control signal corresponding to a difference signal between said reference flesh signal and said input carrier chrominance signal; and
    a carrier chrominance signal corrector for receiving one of said reference flesh signals, said input carrier chrominance signal, and said control signal, and for mixing the former two signals in response to the latter control signal;
    wherein said reference flesh signal generator comprises: a subcarrier adjustor for receiving a subcarrier, and for changing a phase and/or an amplitude of said subcarrier; and reference flesh signal generators a and b for receiving an output signal of said subcarrier adjustor, and for generating reference flesh signals;
    wherein said reference flesh signal generator a comprises: a multiplier for receiving an input carrier chrominance signal and an output signal of said subcarrier adjustor, and for multiplying both signals; and a band pass filter for receiving an output signal of said multiplier, and for passing a fundamental frequency component of the output signal of said multiplier.

6. A flesh correction circuitry for a color television receiver according to claim 5, wherein said reference flesh signal generator a further comprises: an amplitude limiter for receiving an output signal of said band pass filter, and for limiting an amplitude of the output signal of said band pass filter to a constant level.

7. A flesh correction circuitry for a color television receiver, for obtaining a desired flesh reproduction and for minimizing color distortions included in a transmitted color signal, comprising:
a reference flesh signal generator for generating two kinds of reference flesh signals;
a flesh signal detector for receiving one of said reference flesh signals and an input carrier chrominance signal, and for generating a control signal corresponding to a difference signal between said reference flesh signal and said input carrier chrominance signal; and
a carrier chrominance signal corrector for receiving one of said reference flesh signals, said input carrier chrominance signal, and said control signal, and for mixing the former two signals in response to the latter control signal;
wherein said reference flesh signal generator comprises: a subcarrier adjustor for receiving a subcarrier, and for changing a phase and/or an amplitude of said subcarrier; and reference flesh signal generators a and b for receiving an output signal of said subcarrier adjustor, and for generating reference flesh signals;
wherein said reference flesh signal generator b comprises: an amplitude modulator for receiving a luminance signal and an output signal of said subcarrier adjustor, and for modulating the output signal of said subcarrier adjustor with the luminance signal.

8. A flesh correction circuitry for a color television receiver, for obtaining a desired flesh reproduction and for minimizing color distortions included in a transmitted color signal, comprising:
a reference flesh signal generator for generating two kinds of reference flesh signals;
a flesh signal detector for receiving one of said reference flesh signals and an input carrier chrominance signal, and for generating a control signal corresponding to a difference signal between said reference flesh signal and said input carrier chrominance signal; and
a carrier chrominance signal corrector for receiving one of said reference flesh signals, said input carrier chrominance signal, and said control signal, and for mixing the former two signals in response to the latter control signal;
wherein said reference flesh signal generator comprises: a subcarrier adjustor for receiving a subcarrier, and for changing a phase and/or an amplitude of said subcarrier; and reference flesh signal generators a and b for receiving an output signal of said subcarrier adjustor, and for generating reference flesh signals;
wherein said reference flesh signal generator b comprises: a clipper for receiving a luminance signal, and for clipping a portion of said luminance signal; and an amplitude modulator for receiving an output signal of said subcarrier adjustor and an output signal of said clipper, and for modulating the output signal of said subcarrier adjustor with the output signal of said clipper.

9. A flesh correction circuitry for a color television receiver, for obtaining a desired flesh reproduction and for minimizing color distortions included in a transmitted color signal, comprising:
a reference flesh signal generator for generating two kinds of reference flesh signals;
a flesh signal detector for receiving one of said reference flesh signals and an input carrier chrominance signal, and for generating a control signal corresponding to a difference signal between said reference flesh signal and said input carrier chrominance signal; and
a carrier chrominance signal corrector for receiving one of said reference flesh signals, said input carrier chrominance signal, and said control signal, and for mixing the former two signals in response to the latter control signal;
wherein said reference flesh signal generator comprises: a subcarrier adjustor for receiving a subcarrier, and for changing a phase and/or an amplitude of said subcarrier; and reference flesh signal generators a and b for receiving an output signal of said subcarrier adjustor, and for generating reference flesh signals;
wherein said reference flesh signal generator b comprises: an amplitude detector for receiving an input carrier chrominance signal, and for detecting an amplitude of the input carrier chrominance signal; and an amplitude modulator for receiving an output signal of said subcarrier adjustor and an output signal of said amplitude detector, and for modulating the output signal of said subcarrier adjustor by the output signal of said amplitude detector.

10. A flesh correction circuitry for a color television receiver, for obtaining a desired flesh reproduction and for minimizing color distortions included in a transmitted color signal, comprising:
a reference flesh signal generator for generating two kinds of reference flesh signals;
a flesh signal detector for receiving one of said reference flesh signals and an input carrier chrominance signal, and for generating a control signal corresponding to a difference signal between said reference flesh signal and said input carrier chrominance signal; and
a carrier chrominance signal corrector for receiving one of said reference flesh signals, said input carrier chrominance signal, and said control signal, and for mixing the former two signals in response to the latter control signal;
wherein said reference flesh signal generator comprises: a subcarrier adjustor for receiving a subcarrier, and for changing a phase and/or an amplitude of said subcarrier; and reference flesh signal generators a and b for receiving an output signal of said subcarrier adjustor, and for generating reference flesh signals;
wherein said reference flesh signal generator b comprises: an amplitude detector for receiving an input carrier chrominance signal, and for detecting an amplitude of the input carrier chrominance signal; a clipper for receiving an output signal of said amplitude detector, and for clipping a portion of the output signal of said amplitude detector representative of a low color saturation; and an amplitude modulator for receiving an output signal of said clipper and an output signal of said subcarrier adjustor, and for modulating the output signal of said subcarrier adjustor with the output signal of said clipper.

11. A flesh correction circuitry for a color television receiver, for obtaining a desired flesh reproduction and for minimizing color distortions included in a transmitted color signal, comprising:
- a reference flesh signal generator for generating two kinds of reference flesh signals;
- a flesh signal detector for receiving one of said reference flesh signals and an input carrier chrominance signal, and for generating a control signal corresponding to a difference signal between said reference flesh signal and said input carrier chrominance signal; and
- a carrier chrominance signal corrector for receiving one of said reference flesh signals, said input carrier chrominance signal, and said control signal, and for mixing the former two signals in response to the latter control signal;
- wherein said reference flesh signal generator comprises: a subcarrier adjustor for receiving a subcarrier, and for changing a phase and/or an amplitude of said subcarrier; and reference flesh signal generators a and b for receiving an output signal of said subcarrier adjustor, and for generating reference flesh signals;
- wherein said flesh signal detector comprises: an amplitude modulator for receiving an input carrier chrominance signal and a luminance signal, and for modulating the input carrier chrominance signal with the luminance signal; a subcarrier for receiving an output signal of said amplitude modulator and an output signal of said reference flesh signal generator a, and for subtracting the input carrier chrominance signal from the output signal of said reference flesh signal generator a; and an amplitude detector for receiving an output signal of said subtractor, and for detecting an amplitude of the output signal of said subtractor.

12. A flesh correction circuitry for a color television receiver, for obtaining a desired flesh reproduction and for minimizing color distortions included in a transmitted color signal, comprising:
- a reference flesh signal generator for generating two kinds of reference flesh signals;
- a flesh signal detector for receiving one of said reference flesh signals and an input carrier chrominance signal, and for generating a control signal corresponding to a difference signal between said reference flesh signal and said input carrier chrominance signal; and
- a carrier chrominance signal corrector for receiving one of said reference flesh signals, said input carrier chrominance signal, and said control signal, and for mixing the former two signals in response to the latter control signal;
- wherein said reference flesh signal generator comprises: a subcarrier adjustor for receiving a subcarrier, and for changing a phase and/or an amplitude of said subcarrier; and reference flesh signal generators a and b for receiving an output signal of said subcarrier adjustor, and for generating reference flesh signals;
- wherein said carrier chrominance signal corrector comprises: a mixer for receiving an input carrier chrominance signal, an output signal of said reference flesh signal generator b, and an output signal of said flesh signal detector, and for mixing the input carrier chrominance signal and the output signal of said reference flesh signal generator b with a mixing ratio controlled by the output signal of said flesh signal detector.

13. A flesh correction circuitry for a color television receiver according to claim 12, wherein said carrier chrominance signal corrector further comprises: an adder for receiving an input carrier chrominance signal and an output signal of said mixer, and for adding these received signals.

14. A flesh correction circuitry for a color television receiver, for obtaining a desired flesh reproduction and for minimizing color distortions included in a transmitted color signal, comprising:
- a reference flesh signal generator for generating two kinds of reference flesh signals;
- a flesh signal detector for receiving one of said reference flesh signals and an input carrier chrominance signal, and for generating a control signal corresponding to a difference signal between said reference flesh signal and said input carrier chrominance signal; and
- a carrier chrominance signal corrector for receiving one of said reference flesh signals, said input carrier chrominance signal, and said control signal, and for mixing the former two signals in response to the latter control signal;
- wherein said reference flesh signal generator comprises: a subcarrier adjustor for receiving a subcarrier, and for changing a phase and/or an amplitude of said subcarrier; and reference flesh signal generators a and b for receiving an output signal of said subcarrier adjustor, and for generating reference flesh signals;
- wherein said carrier chrominance signal corrector comprises: a mixer a for receiving an input carrier chrominance signal, an output signal of said reference flesh signal generator b and an output signal of said flesh signal detector, and for mixing the input carrier chrominance signal and the output signal of said reference flesh signal generator b with a mixing ratio controlled by the output signal of said flesh signal detector; and a mixer b for receiving the input carrier chrominance signal, an output signal of said mixer a and the output signal of said flesh signal detector, and for mixing the input carrier chrominance signal and the ouput signal of said mixer a with a mixing ratio controlled by the output signal of said flesh signal detector.

15. A flesh correction circuitry for a color television receiver according to claim 14, wherein said carrier chrominance signal corrector further comprises: an adder for receiving the input carrier chrominance signal and an output signal of said mixer b, and for adding these received signals.

* * * * *